United States Patent
Hsieh et al.

(10) Patent No.: US 9,609,465 B2
(45) Date of Patent: Mar. 28, 2017

(54) MULTI-ROLE BLUETOOTH DEVICE AND BLUETOOTH CONNECTION METHOD THEREOF

(71) Applicant: AIROHA TECHNOLOGY CORP., Hsinchu (TW)

(72) Inventors: Kuen-Rong Hsieh, Hsinchu (TW); Chi-Teng Weng, Hsinchu (TW); Chun-Yi Chen, Hsinchu (TW); Tsung-Hui Ku, Hsinchu (TW)

(73) Assignee: Airoha Technology Corp., Hsinchu (TW)

( * ) Notice: Subject to any disclaimer, the term of this patent is extended or adjusted under 35 U.S.C. 154(b) by 0 days.

(21) Appl. No.: 14/714,445

(22) Filed: May 18, 2015

(65) Prior Publication Data
US 2015/0350816 A1 Dec. 3, 2015

Related U.S. Application Data

(60) Provisional application No. 62/005,017, filed on May 30, 2014.

(51) Int. Cl.
*H04M 1/00* (2006.01)
*H04W 4/00* (2009.01)
*H04M 1/60* (2006.01)
*H04M 1/725* (2006.01)

(52) U.S. Cl.
CPC ......... *H04W 4/008* (2013.01); *H04M 1/6066* (2013.01); *H04M 1/7253* (2013.01); *H04M 2215/7231* (2013.01); *H04M 2250/02* (2013.01)

(58) Field of Classification Search
USPC .................. 455/41.2; 370/466, 338, 349
See application file for complete search history.

(56) References Cited

U.S. PATENT DOCUMENTS

| | | | | |
|---|---|---|---|---|
| 2004/0085947 | A1* | 5/2004 | Ekberg | H04W 48/16 370/349 |
| 2005/0021725 | A1* | 1/2005 | Lobbert | H04W 48/16 709/223 |
| 2005/0097087 | A1* | 5/2005 | Punaganti Venkata | H04L 69/08 |
| 2005/0281237 | A1* | 12/2005 | Heinonen | H04L 29/06 370/338 |
| 2006/0133414 | A1* | 6/2006 | Luoma | H04W 88/16 370/466 |
| 2010/0015919 | A1* | 1/2010 | Tian | H04W 8/005 455/41.2 |

* cited by examiner

*Primary Examiner* — Ganiyu A Hanidu
(74) *Attorney, Agent, or Firm* — Rosenberg, Klein & Lee

(57) ABSTRACT

The present invention relates to a multi-role Bluetooth device and more particularly to a multi-role Bluetooth handset. The multi-role Bluetooth device stores a plurality of SDPs (Service Discovery Protocols), and establishes Bluetooth connection with an electronic device by one of SDPs. The multi-role Bluetooth device can establish Bluetooth connection with the electronic device by a first SDP, and transmit and/or receive data to the electronic device each other via Bluetooth connection. Furthermore, the multi-role Bluetooth device also can establish Bluetooth connection with the electronic device by a second SDP, and transmit a control signal to the electronic device via Bluetooth connection to control the electronic device to execute particular function thereof.

13 Claims, 4 Drawing Sheets

MULTI-ROLE BLUETOOTH DEVICE AND BLUETOOTH CONNECTION METHOD THEREOF

REFERENCE TO RELATED APPLICATIONS

This application is based on Provisional application Ser. No. 62/005,017, filed on May 30, 2014.

FIELD OF THE INVENTION

The present invention is related to a multi role Bluetooth device which is able to establish Bluetooth connect with an electronic device by different kinds of SDPs (Service Discovery Protocols) for providing different kinds of services or functions to the electronic device.

BACKGROUND

Currently the conventional electronic devices always equip with Bluetooth communication devices, and thus nearby electronic devices are able to establish Bluetooth connection for transmitting data or multi-media data each other via Bluetooth connection to improve convenience of using electronic devices.

Please referring to FIG. 1, there is shown a connection diagram of a conventional Bluetooth headset and an electronic device. The electronic device 10 is able to establish Bluetooth connect with the Bluetooth handset 13, and transmit multi-media data via Bluetooth connection. Thus, the Bluetooth handset can be a handsfree device.

In actual application, the electronic device 11 transmits digital multi-media data to the Bluetooth headset 13. The Bluetooth headset 13 converts the digital multi-media data into analog multi-media data, and then plays the analog multi-media data via speakers thereof.

Further, microphones of the Bluetooth handset 13 is able to receive audio signal from outside, and convert the audio signal to digital signal, and then transmit the digital signal to the electronic device 11 via Bluetooth connection.

SUMMARY

It is one object of the present invention to provide a multi-role Bluetooth device and a Bluetooth connection method thereof. The multi-role Bluetooth device stores a plurality of SDPs, and is able to select one of SDPs to establish Bluetooth connection with an electronic device. The multi-role Bluetooth device provides corresponding service to the electronic device based on the selected SDP. Thus, the multi-role Bluetooth device is able to provide various kinds of services or functions for the electronic device.

For achieving above objects, the present invention provides a multi-role Bluetooth device, comprising: a storage unit storing a plurality of Service Discovery Protocols, wherein each of the Service Discovery Protocols provides different kinds of services respectively: a Bluetooth module for transmitting data; and a control unit connected to the storage unit and the Bluetooth module, wherein the control unit selects one of the Service Discovery Protocols to establish Bluetooth connection of the multi-role Bluetooth device and an electronic device, and the multi-role Bluetooth device provides one of services to the electronic device according to the selected Service Discovery Protocol.

The present invention further provides a Bluetooth connection method of a multi-role Bluetooth device, comprising the steps of: storing a plurality of Service Discovery Protocols by the multi-role Bluetooth device, wherein each of the Service Discovery Protocols provides different kinds of services respectively; selecting one of the Service Discovery Protocols by the multi-role Bluetooth device; establishing Bluetooth connection between an electronic device and the multi-role Bluetooth device according to the selected Service Discovery Protocol; and providing one of services to the electronic device according to the selected Service Discovery Protocol.

In one embodiment of the multi-role Bluetooth device, further comprises a switching unit electrically connected to the control unit for controlling or switching the control unit to select one of the Service Discovery Protocols to establish Bluetooth connection of the multi-role Bluetooth device and the electronic device.

In one embodiment of the multi-role Bluetooth device, the multi-role Bluetooth device transmits a control signal to the electronic device via the Bluetooth module for controlling the electronic device to execute a particular or preset function.

In one embodiment of the multi-role Bluetooth device, the multi-role Bluetooth device and the electronic device transmit a digital signal via Bluetooth connection.

In one embodiment of the multi-role Bluetooth device, further comprises a digital signal processor electronically connected to the control unit to convert the digital signal into an analog signal.

In one embodiment of the multi-role Bluetooth device, further comprises at least one speaker electronically connected to the digital signal processor for playing the analog signal.

In one embodiment of the multi-role Bluetooth device, further comprises at least one microphone electronically connected to the digital signal processor for receiving an audio signal from outside and transmitting the audio signal to the digital signal processor.

In one embodiment of the multi-role Bluetooth device, further comprises a switching unit electronically connected to the control unit for controlling or switching the control unit to select or switch the class of device of the multi-role Bluetooth device.

In one embodiment of the Bluetooth connection method, further comprises the step of: transmitting a digital signal between the multi-role Bluetooth device and the electronic device via Bluetooth connection.

In one embodiment of the Bluetooth connection method, further comprises the step of: converting and playing the digital signal by the multi-role Bluetooth device.

In one embodiment of the Bluetooth connection method, further comprises the steps of: receiving and converting an audio signal by the multi-role Bluetooth device; and transmitting the converted audio signal to the electronic device from the multi-role Bluetooth device.

In one embodiment of the Bluetooth connection method, further comprises the steps of: transmitting a control signal to the electronic device from the multi-role Bluetooth device; and photographing or generating noise or light by the electronic device.

In one embodiment of the Bluetooth connection method, further comprises the step of: storing a plurality of Class of Devices by the multi-role Bluetooth device; selecting or switching one of the Class of Devices by the multi-role Bluetooth device; and establishing Bluetooth connection between the electronic device and the multi-role Bluetooth device according to the selected Class of Device.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
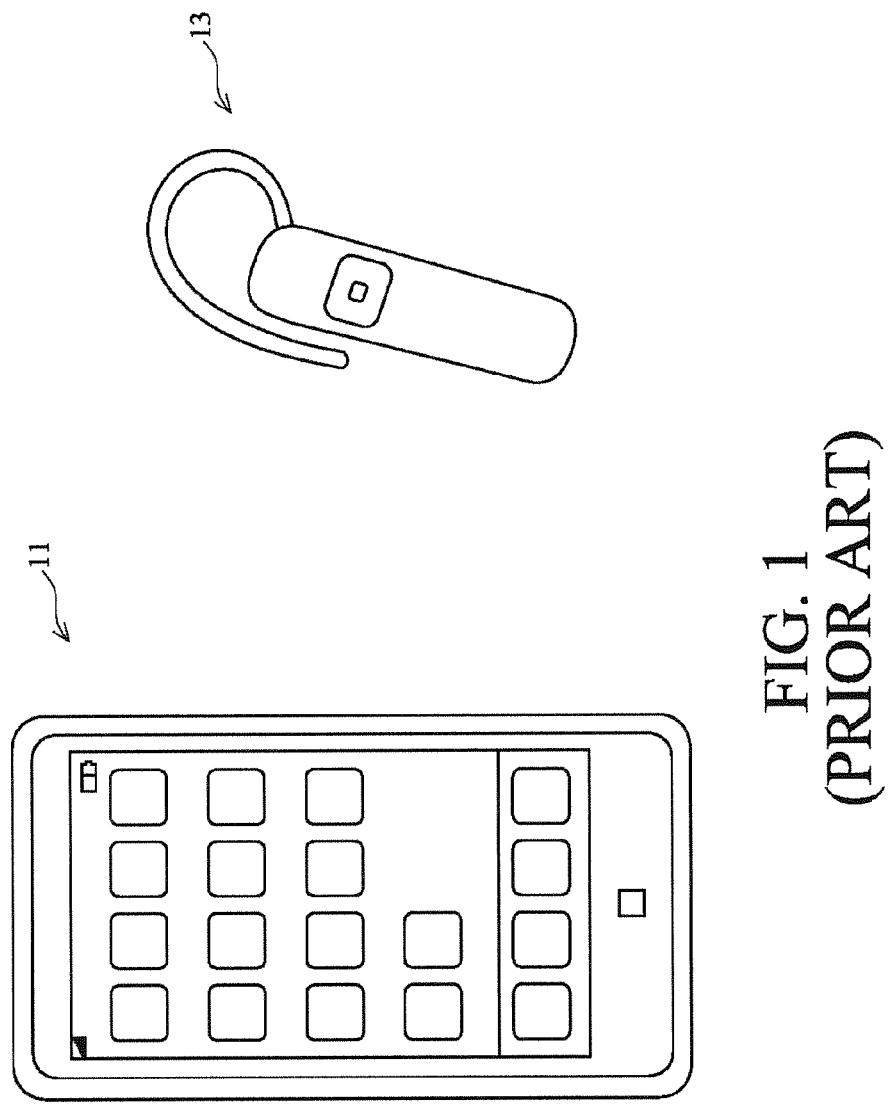
FIG. 1 is a connection diagram of a conventional Bluetooth headset and an electronic device.
Figure 2:
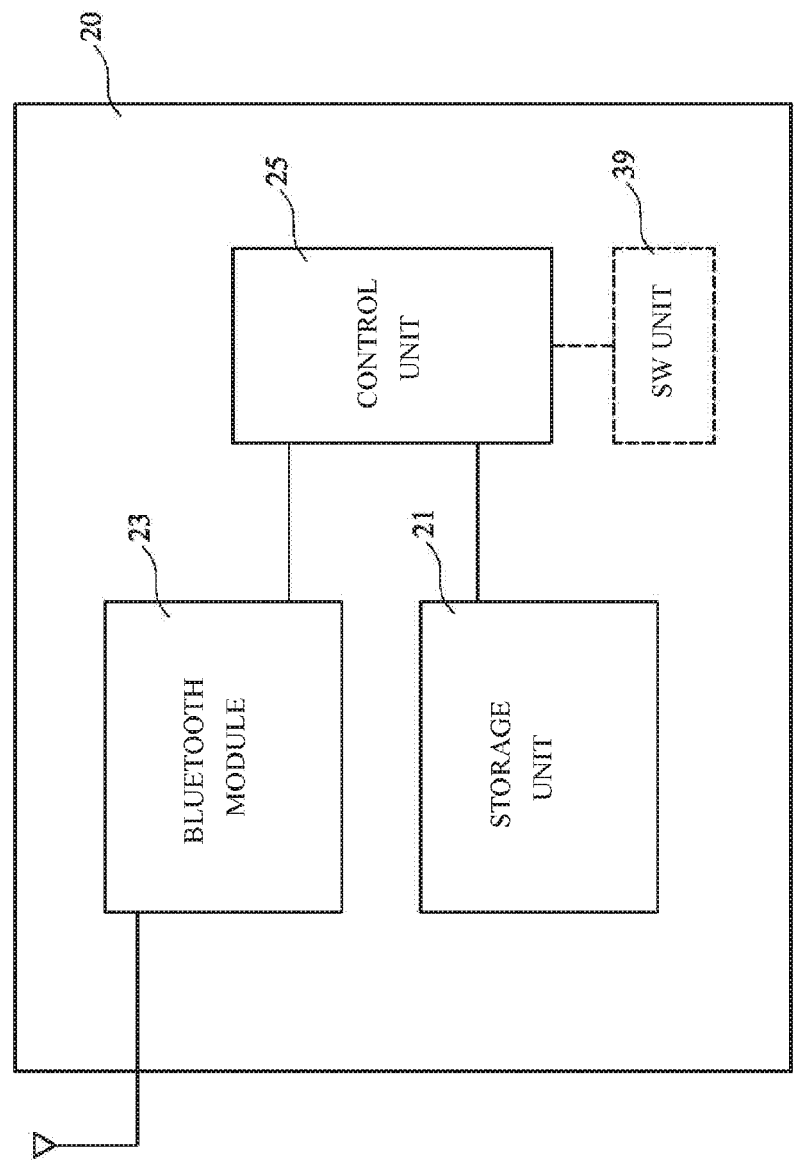
FIG. 2 is a block diagram of a multi-role Bluetooth device according to the first embodiment of the present invention.

Referring to FIG. 2, there is shown a block diagram of a multi-role Bluetooth device according to the first embodiment of the present invention. The multi-role Bluetooth device 20 comprises a storage unit 21, a Bluetooth module 23 and a control unit 25. The control unit 25 is electrically connected to the storage unit 21 and the Bluetooth module 23, and the Bluetooth module 23 is able to transmit data.

The SDP (service discovery protocol) defines actions for both a master and a slave. The master knows the service provided by the nearby slave based on the SDP, and establishes Bluetooth connection with the slave. The master may comprise but not limited to mobile, smart phone, computer, tablet or notebook, and the slave may comprise but not limited to Bluetooth headset.

In one embodiments of the invention, the electronic device may be defined as the master, and the multi-role Bluetooth device 20 may be defined as slave. During establishment of Bluetooth connection, the electronic device transmits a SDP request (service discovery protocol request) to the nearby multi-role Bluetooth device 20, and the multi-role Bluetooth device 20 transmits a SDP response (service discovery protocol response) to the electronic device. Thereafter, the multi-role Bluetooth device 20 transmits a SDP request to the electronic device, and the electronic device transmits a SDP response to the multi-role Bluetooth device 20.

The electronic device transmits a service setup to the multi-role Bluetooth device 20, and then the multi-role Bluetooth device 20 transmits a service setup response to the electronic device. Thus, the Bluetooth connection between the multi-role Bluetooth device 20 and the electronic device can be established, and the multi-role Bluetooth device 20 and the electronic device are able to transmit service data communication each other.

In an embodiment of the invention, the storage unit 21 of the multi-role Bluetooth device 20 stores a plurality of SDPs, and each of SDPs provides different kinds of services respectively. The control unit 25 of the multi-role Bluetooth device 20 is able to select one of SDPs stored in the storage unit 21. As the electronic device (master) transmits the SDP request to the multi-role Bluetooth device 20, the multi-role Bluetooth device 20 will transmit the SDP response to the electronic device based on the selected SDP. Thus, the electronic device and the multi-role Bluetooth device 20 establish Bluetooth connection according to the selected SDP, and the multi-role Bluetooth device 20 is able to provide corresponding service to the electronic device.

In one embodiment of the invention, the multi-role Bluetooth device 20 may comprise but not limited to a first SDP and a second SDP. For example, the first SDP is HSP (Handset profile), and the second SDP is HID (Human interface device profile). As the user selects the first SDP of the multi-role Bluetooth device 20, the electronic device (master) and the multi-role Bluetooth device 20 will establish Bluetooth connection based on the first SDP. For example, the first SDP (HSP) provides support for the multi-role Bluetooth device 20 to be a Bluetooth headset and be used with the electronic device, and thus the multi-role Bluetooth device 20 and the electronic device transmit digital signal or multi-media signal each other via Bluetooth connection.

As the user selects the second SDP of the multi-role Bluetooth device 20, the electronic device (master) and the multi-role Bluetooth device 20 establish Bluetooth connection based on the second SDP. The multi-role Bluetooth device 20 is able to transmit a control signal to the electronic device to execute particular or preset function or service. The HID provides support for the multi-role Bluetooth device 20 to be a human interface device, such as a mouse, a joystick, a keyboard, or a remote shutter. In one embodiment of the invention, as the electronic device receives the control signal form the multi-role Bluetooth device 20, the electronic device will generate light or noise. Thus, the multi-role Bluetooth device 20 is a key finder of the electronic device. In another embodiment of the invention, as the electronic device receives the control signal form the multi-role Bluetooth device 20, the electronic device will photograph. Thus, the multi-role Bluetooth device 20 is a remote shutter of the electronic device.

In above embodiment of the invention, the multi-role Bluetooth device 20 comprises two kinds of SDPs. In actual application, the multi-role Bluetooth device 20 may comprise more than two kinds of SDPs. Moreover, the SDPs stored by the multi-role Bluetooth device 20 are not limited to HSP and HID, and further comprise A2DP (Advanced Audio Distribution Profile), BIP (Basic Imaging Profile), AVRCP (Audio/Video Remote Control Profile), BPP (Basic Printing Profile), Cordless Telephony Profile, Intercom Profile, Fax Profile, Serial Port Profile, SIM Access Profile, Synchronization Profile, File Transfer Profile, Generic Access Profile, Generic Object Exchange Profile, Object Push Profile, Personal Area Networking Profile, Phone Book Access Profile, Video Distribution Profile, and so on.

The method of establishing Bluetooth connection of the multi-role Bluetooth device 20 and the electronic device is similar to conventional method. The repetitious details need not be given here.

Accordingly, the multi-role Bluetooth device 20 of the invention stores a plurality of SDPs, and the multi-role Bluetooth device 20 is able to establish Bluetooth connection with the electronic device according to the SDP selected by the user. Thus, the multi-role Bluetooth device 20 has a plurality of functions or services, and is able to provide different kinds of functions or services to the electronic device (master) at different time to improve convenience of using the multi-role Bluetooth device 20.

Figure 3:
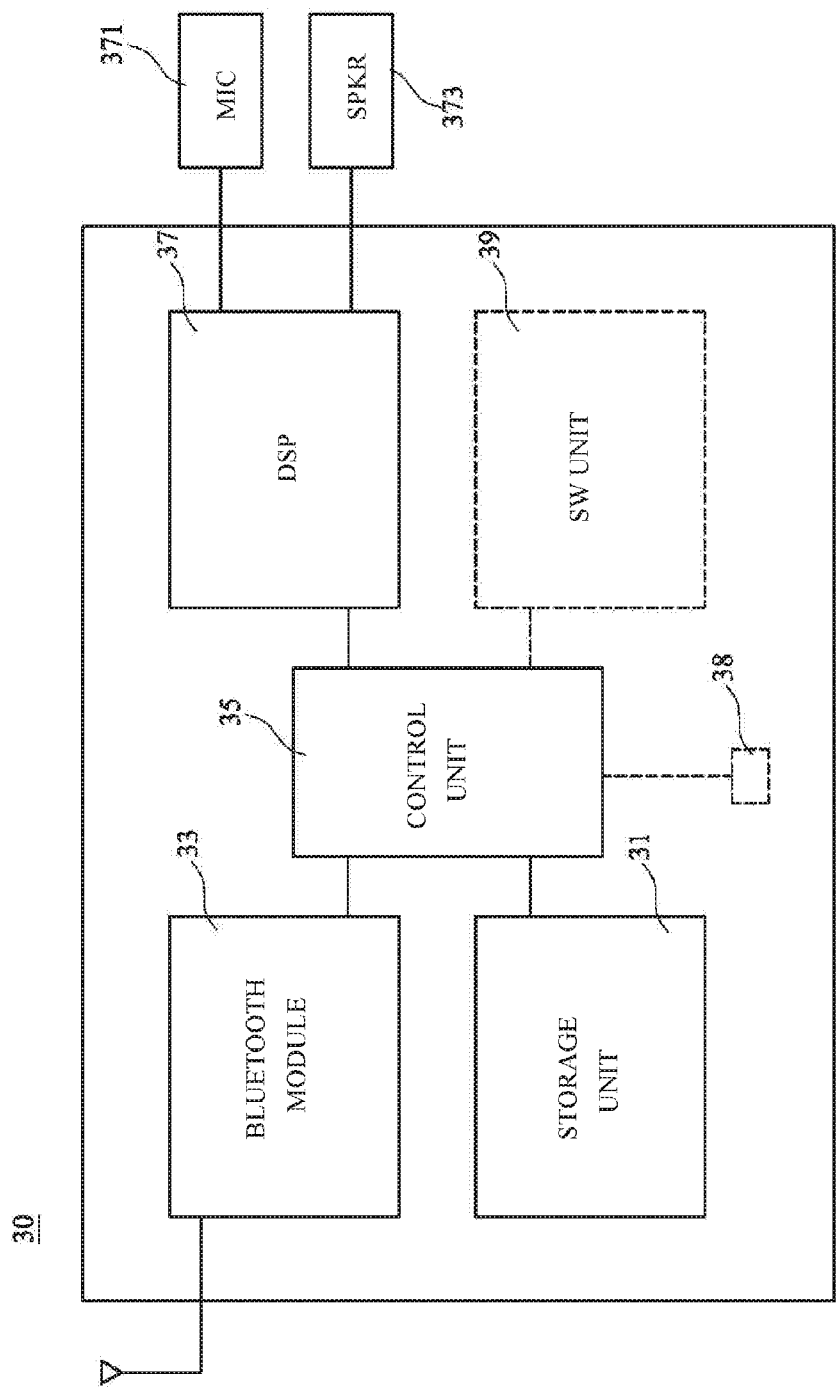
FIG. 3 is a block diagram of a multi-role Bluetooth device according to the second embodiment of the present invention.

Referring to FIG. 3, there is shown a block diagram of a multi-role Bluetooth device according to the second embodiment of the present invention. The multi-role Bluetooth device 30 comprises a storage unit 31, a Bluetooth module 33, a control unit 35 and a DSP (digital signal processor). The control unit 35 is electrically connected to the storage unit 31, the Bluetooth module 33 and the DSP 37.

The storage unit 31 of the multi-role Bluetooth device 30 stores a plurality of SDPs for providing different kinds of services. The control unit 35 of the multi-role Bluetooth device 30 is able to select one of SDPs stored in the storage unit 31. As the electronic device (master) transmits a SDP request to the multi-role Bluetooth device 30, the multi-role Bluetooth device 30 will transmit a SDP response to the electronic device based on the selected SDP. Thus, the electronic device and the multi-role Bluetooth device 30 establish Bluetooth connection according to the selected SDP, and the multi-role Bluetooth device 30 is able to provide corresponding service to the electronic device.

The multi-role Bluetooth device 30 of the embodiment is similar to the multi-role Bluetooth device 20 of the first embodiment. The main different between two embodiments is the multi-role Bluetooth device 30 further comprising the DSP 37. The DSP 37 is used to convert and process digital data and analog data.

When the multi-role Bluetooth device 30 and the electronic device (master) establish Bluetooth connection based on HSP, the electronic device and the multi-role Bluetooth device 20 are able to transmit the digital signal, such as the digital multi-media data, each other. The DSP 37 of the multi-role Bluetooth device 30 is able to convert and process the digital signal or the digital multi-media data into the analog signal or the analog multi-media data.

In one embodiment of the invention, the DSP 37 is electronically connected to at least one microphone 371 and/or at least one speaker 373, and the speaker 373 receives and plays the analog signal or the analog multi-media data converted by the DSP 37, and thus the user is able to listen to the audio signal from the speaker 373.

Further, the microphone 371 is able to receive audio signal from outside, such as voice of the user, and transmit the audio signal to the DSP 37. The DSP 37 converts and processes the audio signal into the digital signal, and transmits the digital signal to the electronic device (master) via the Bluetooth module 33. Thereafter, the multi-role Bluetooth device 30 of the embodiment can be the handsfree headset.

In one embodiment of the invention, the multi-role Bluetooth device 30 further comprises a switching unit 39 electronically connected to the control unit 35. The switching unit 39 can be used to control or switch the control unit 35 to select one of SDPs stored in the storage unit 31, and the multi-role Bluetooth device 30 and the electronic device (master) establish Bluetooth connection according to the selected SDP.

The switching unit 39 is a human interface device, such as a button or a touch panel, and the user can select one of SDPs stored in the storage unit 31 by pushing the button or touching the touch panel. In one embodiment, the multi-role Bluetooth device 30 stores a first SDP, a second SDP and a third SDP, and the multi-role Bluetooth device 30 is preset to establish Bluetooth connection with the electronic device by the first SDP, as the multi-role Bluetooth device 30 is turned on. When the user pushes or touches the switching unit 391 of the multi-role Bluetooth device 30, the control unit 35 will select the second SDP to establish Bluetooth connection with the electronic device. When the user pushes or touches the switching unit 391 again, the control unit 35 will select the third SDP to establish Bluetooth connection with the electronic device.

In another embodiment of the invention, the multi-role Bluetooth device 30 further comprises at least one display unit 38, such as the LCD display or the LED. The display unit 38 is located on the surface of the multi-role Bluetooth device 30 to indicate the selected or used SDP presently. For example, the user is able to know the service provided by the SDP of the multi-role Bluetooth device 30 by the display unit 38 to improve the convenience of operation of the multi-role Bluetooth device 30.

Figure 4:
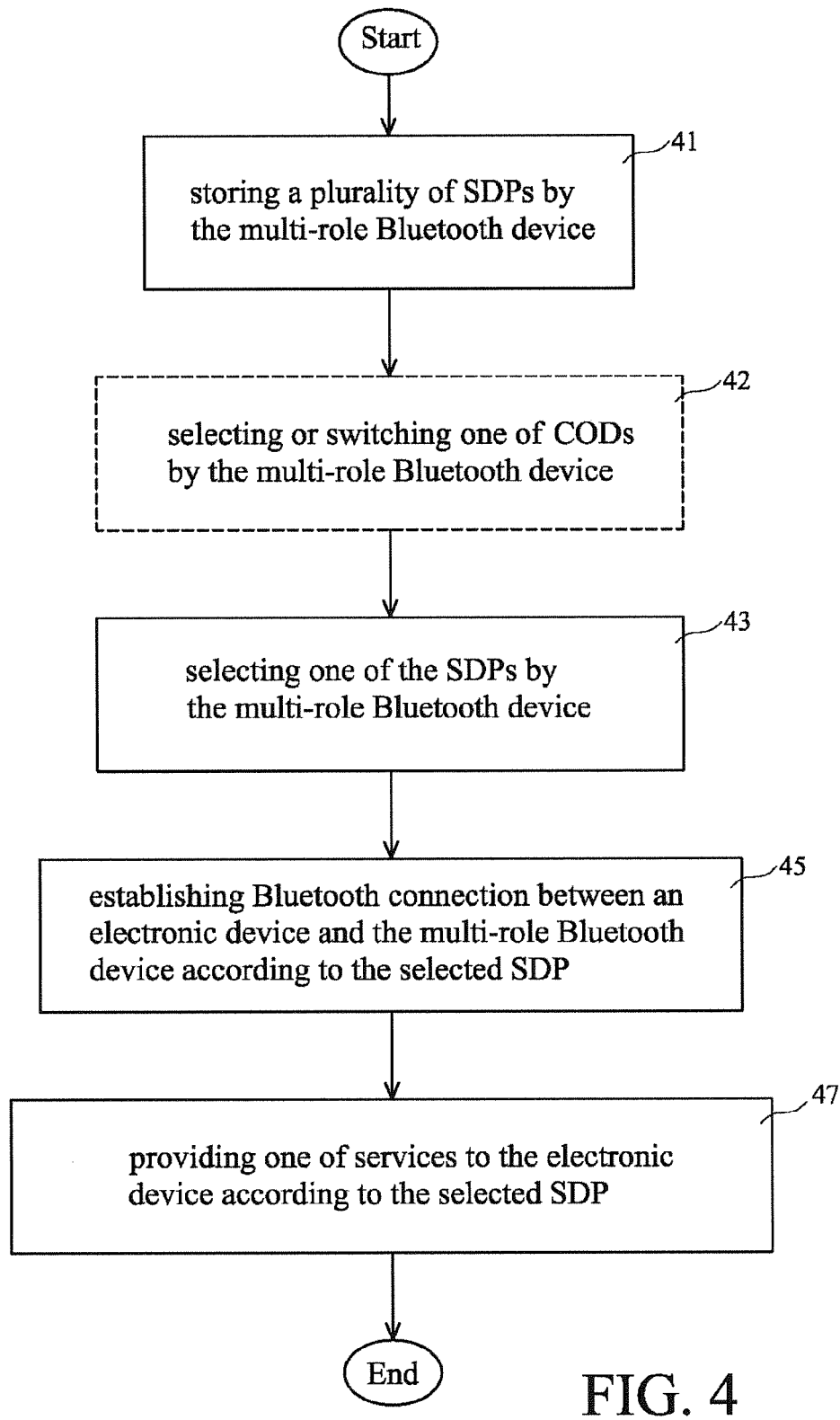
FIG. 4 is a flow chart of a Bluetooth connection method of a multi-role Bluetooth device according to an embodiment of the present invention.

Referring to FIG. 4, there is shown a flow chart of a Bluetooth connection method of the multi-role Bluetooth device according to an embodiment of the present invention. Please referring to FIGS. 2 and 3, the multi-role Bluetooth device 20/30 stores a plurality of SDPs for providing different kinds of services, as the step 41. For example, SDPs are stored in the storage unit 21/31 of the multi-role Bluetooth devices 20/30.

As the multi-role Bluetooth device 20/30 and the electronic device (master) establish Bluetooth connection, the multi-role Bluetooth device 20/30 may pre-select one of SDPs, as the step 43. The multi-role Bluetooth device 20/30 is able to provide different kinds of services or functions based on the selected SDP.

The multi-role Bluetooth device 20/30 establishes Bluetooth connection with the electronic device according to the selected SDP, as the step 45. In one embodiment of the invention, the electronic device may be defined as master, and the multi-role Bluetooth devices 20/30 may be defined as slave. The electronic device (master) enters a page scan state, and transmits the page to the multi-role Bluetooth devices 20/30, and then the multi-role Bluetooth devices 20/30 transmits a page response to the electronic device (master). The electronic device transmits a SDP request to the nearby multi-role Bluetooth device 20/30, and the multi-role Bluetooth device 20/30 transmits a SDP response to the electronic device. Further, the multi-role Bluetooth device 20/30 transmits a SDP request to the electronic device, and the electronic device transmits a SDP response to the multi-role Bluetooth device 20/30. Thereafter, the multi-role Bluetooth device 20/30 and the electronic device are able to transmit service data communication to establish Bluetooth connection therebetween.

The multi-role Bluetooth device 20/30 is able to selects one of SDPs, and establish Bluetooth connection with the electronic device according to the selected SDP for providing the corresponding service or function to the electronic device, as the step 47. In actual application, SDPs stored by the multi-role Bluetooth device 20/30 may comprise but not limited to HSP (Handset profile), HID (Human interface device profile), A2DP (Advanced Audio Distribution Profile), BIP (Basic Imaging Profile), AVRCP (Audio/Video Remote Control Profile), BPP (Basic Printing Profile), Cordless Telephony Profile, Intercom Profile, Fax Profile, Serial Port Profile, SIM Access Profile, Synchronization Profile, File Transfer Profile. Generic Access Profile, Generic Object Exchange Profile, Object Push Profile, Personal Area Networking Profile, Phone Book Access Profile, Video Distribution Profile, and so on.

As the multi-role Bluetooth device 20/30 establishes Bluetooth connection with the electronic device based on HSP, the multi-role Bluetooth device 20/30 is able to provide service of HSP to the electronic device, and then the multi-role Bluetooth device 20/30 is a Bluetooth handset for the electronic device. For example, the electronic device and the multi-role Bluetooth device 20/30 are able to transmit the digital signal or the digital multi-media data each other, and the multi-role Bluetooth device 20/30 is able to convert and play the digital signal. Further, the multi-role Bluetooth device 20/30 is able to receive audio signal from outside, and convert and transmit the audio signal to the electronic device.

When the multi-role Bluetooth device 20/30 establishes Bluetooth connection with the electronic device based on HID, the multi-role Bluetooth device 20/30 is able to provide service of HID to the electronic device, and then the multi-role Bluetooth device 20/30 is a Bluetooth remote control device for the electronic device. Thus, the multi-role Bluetooth device 20/30 is able to transmit a control signal to the electronic device to control the electronic device to execute particular function. For example, the multi-role Bluetooth device 20/30 can be a Bluetooth mouse, a Bluetooth key finder, a Bluetooth remote shutter or a remote control device, and the user is able to control the electronic device to generate noise or light or photograph by the multi-role Bluetooth device 20/30.

Above embodiment of the invention describes the steps of Bluetooth connection of the electronic device and the multi-role Bluetooth device 20/30. In actual application, the multi-role Bluetooth device 20/30 may store a plurality of CODs (class of devices), and each of CODs is able to describe a unique class of device. The electronic device transmits a question signal before establishing Bluetooth connection, and the multi-role Bluetooth device 20/30 transmits a response signal to the electronic device. The response signal comprises one of CODs stored by the multi-role Bluetooth device 20/30, and the electronic device is able to know what kinds of device the multi-role Bluetooth device 20/30 is. For example, the COD may comprise but not limited to the HSP, HID or A2DP.

In generally, the steps or the method of establishing Bluetooth connection may be difference based on the operating system of the electronic device. For partial operating systems of electronic devices, the COD of the response signal makes no difference to the method or steps of establishing Bluetooth connection. Thus, this kind of electronic device is able to use the method of the above embodiment to establish Bluetooth connection with the multi-role Bluetooth device 20/30.

However, for other operating systems of electronic devices, the COD of the response signal makes difference to the method of establishing Bluetooth connection. For example, as the COD of the response signal transmitted by the multi-role Bluetooth device 20/30 to the electronic device is HID, may cause the multi-role Bluetooth device 20/30 fail to provide service of HSP or A2DP to the electronic device, and fail to establish Bluetooth connection of the multi-role Bluetooth device 20/30 and the electronic device by HSP or A2DP.

Thus, the method of establishing Bluetooth connection of the multi-role Bluetooth device 20/30 and the electronic device may further comprise the steps: switching or selecting one of CODs by the multi-role Bluetooth device 20/30, and establishing Bluetooth connection between the electronic device and the multi-role Bluetooth device 20/30 according to the selected Class of Device, as the step 42. For example, the multi-role Bluetooth device 20/30 may store a plurality of CODs, and is able to switch or select one of CODs, and then transmit the response signal comprising the selected COD to the electronic device. As above embodiment, the COD of the multi-role Bluetooth device 20/30 may make no difference to the method of establishing Bluetooth connection, and thus the step 42 is not an absolutely necessary step of the invention.

Further, the order of the step 42 and the step 43 may be change, and it does not disturb the establishment of Bluetooth connection of the multi-role Bluetooth device 20/30 and the electronic device.

In actual application, when the multi-role Bluetooth device 20/30 is unable to establish Bluetooth connection with the electronic device, may represent that the COD and the SDP of the multi-role Bluetooth device 20/30 do not match. Thus, the multi-role Bluetooth device 20/30 may switch the COD by itself to match the COD and the SDP thereof, and the multi-role Bluetooth device 20/30 is able to establish Bluetooth connection with the electronic device. In other embodiment, the user is able to switch or select the COD of the multi-role Bluetooth device 20/30. For example, the multi-role Bluetooth device 20/30 comprises a switching unit 39 electrically connected to the control unit 35, and the user can switch or select the COD of the multi-role Bluetooth device 20/30 by the switching unit 39 to establish Bluetooth connection of the multi-role Bluetooth device 20/30 and the electronic device. The switching unit 39 is not an absolutely device for the multi-role Bluetooth device 20/30.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. A multi-role Bluetooth device, comprising:
   a storage unit storing a plurality of Service Discovery Protocols, wherein said Service Discovery Protocols provide different Bluetooth service profiles respectively;
   a Bluetooth module for transmitting data; and
   a control unit connected to said storage unit and said Bluetooth module, wherein said control unit selects one of said Service Discovery Protocols to establish Bluetooth connection of said multi-role Bluetooth device and an electronic device, and said multi-role Bluetooth device being selectively configured thereby to provide one of a plurality of Bluetooth service profiles to said electronic device according to said selected Service Discovery Protocol;
   wherein said multi-role Bluetooth device transmits a control signal to said electronic device via said Bluetooth module for controlling said electronic device to execute a particular or preset function.

2. The multi-role Bluetooth device according to claim 1, further comprising a switching unit electrically connected to said control unit for controlling or switching said control unit to select one of said Service Discovery Protocols to establish Bluetooth connection of said multi-role Bluetooth device and said electronic device.

3. The multi-role Bluetooth device according to claim 1, wherein said multi-role Bluetooth device and said electronic device transmit a digital signal via Bluetooth connection.

4. The multi-role Bluetooth device according to claim 3, further comprising a digital signal processor electronically connected to said control unit to convert said digital signal into an analog signal.

5. The multi-role Bluetooth device according to claim 4, further comprising at least one speaker electronically connected to said digital signal processor for playing said analog signal.

6. The multi-role Bluetooth device according to claim 4, further comprising at least one microphone electronically connected to said digital signal processor for receiving an audio signal from outside and transmitting said audio signal to said digital signal processor.

7. The multi-role Bluetooth device according to claim 1, further comprising a switching unit electronically connected to said control unit for controlling or switching said control unit to select or switch the class of device of said multi-role Bluetooth device.

8. A Bluetooth connection method of a multi-role Bluetooth device, comprising:
  storing a plurality of Service Discovery Protocols by said multi-role Bluetooth device, wherein said Service Discovery Protocols provide different of Bluetooth service profiles respectively;
  selecting one of said Service Discovery Protocols by said multi-role Bluetooth device; and
  establishing Bluetooth connection between an electronic device and said multi-role Bluetooth device according to said selected Service Discovery Protocol;
  said multi-role Bluetooth device being selectively configured thereby to provide one of a plurality of Bluetooth service profiles to said electronic device according to said selected Service Discovery Protocol;
  wherein said multi-role Bluetooth device transmits a control signal to said electronic device via said Bluetooth module for controlling said electronic device to execute a particular or preset function.

9. The Bluetooth connection method according to claim 8, further comprising: transmitting a digital signal between said multi-role Bluetooth device and said electronic device via Bluetooth connection.

10. The Bluetooth connection method according to claim 9, further comprising: converting and playing said digital signal by said multi-role Bluetooth device.

11. The Bluetooth connection method according to claim 9, further comprising:
  receiving and converting an audio signal by said multi-role Bluetooth device; and
  transmitting said converted audio signal to said electronic device from said multi-role Bluetooth device.

12. The Bluetooth connection method according to claim 8, further comprising:
  transmitting a control signal to said electronic device from said multi-role Bluetooth device; and
  photographing or generating noise or light by said electronic device.

13. The Bluetooth connection method according to claim 8, further comprising:
  storing a plurality of Class of Devices by said multi-role Bluetooth device;
  selecting or switching one of said Class of Devices by said multi-role Bluetooth device; and
  establishing Bluetooth connection between said electronic device and said multi-role Bluetooth device according to said selected Class of Device.

* * * * *